United States Patent [19]

Tixier

[11] 3,985,195
[45] Oct. 12, 1976

[54] VEHICLE SPEED-LIMITING SYSTEM
[75] Inventor: Michel Tixier, St-Cloud, France
[73] Assignees: Regie Nationale des Usines Renault; Automobiles Peugeot, both of France
[22] Filed: Sept. 13, 1974
[21] Appl. No.: 505,943

[30] Foreign Application Priority Data
Sept. 20, 1973 France .................. 73.33812

[52] U.S. Cl. .................. 180/98; 180/105 E; 180/106
[51] Int. Cl.² .................. B60K 41/04
[58] Field of Search .......... 180/98, 105 R, 105 E, 180/106, 109

[56] References Cited
UNITED STATES PATENTS

| | | | |
|---|---|---|---|
| 2,851,555 | 9/1958 | McCloy | 180/105 R X |
| 2,914,960 | 12/1959 | Edgerton | 180/105 R |
| 3,247,740 | 4/1966 | Shuster | 180/98 X |
| 3,368,639 | 2/1968 | Deane | 180/98 |
| 3,378,102 | 4/1968 | Collin | 180/98 |
| 3,476,204 | 11/1969 | Westby | 180/98 |
| 3,599,154 | 8/1971 | Carol | 180/105 E X |
| 3,763,954 | 10/1973 | Permut | 180/98 |

FOREIGN PATENTS OR APPLICATIONS
1,147,459 4/1969 United Kingdom .................. 180/98

Primary Examiner—M. H. Wood, Jr.
Assistant Examiner—Terrance L. Siemens
Attorney, Agent, or Firm—Bucknam and Archer

[57] ABSTRACT

A speed limiting system for a vehicle in which the main speed controlling member is equipped with an overridable return device that applies to such speed controlling member a limited predetermined magnitude of force opposing movement of the speed control member to a higher speed position whenever the vehicle exceeds a predetermined speed. The return means is operated by control signal means utilizing signals representing the actual vehicle speed and an adjustable preset speed limit, and effecting comparison of such signals.

2 Claims, 4 Drawing Figures

VEHICLE SPEED-LIMITING SYSTEM

BACKGROUND OF THE INVENTION

The present invention relates to systems for limiting the speed of a vehicle which may serve as a driving aid and which are of the type which incorporates over-ridable return means which raise a main speed-controlling member, typically a gas or accelerator pedal, with a limited force of at least a predetermined amount as soon as the speed of the vehicle exceeds a predetermined speed.

A driver travelling along a road at a limited speed may be induced to exceed this speed voluntarily or involuntarily. It is, therefore desirable, for obvious reasons of safety, for there to be a device which calls him back to order, bearing in mind that at the present time he has only his speedometer to allow him to judge his speed.

Devices are known which give the driver a visible or audible warning that he has exceeded a predetermined speed. As an example may be mentioned the systems which measure the engine speed by counting the cyclic rate of the ignition. An alarm is triggered at a certain engine-speed which, via the transmission, corresponds to a certain speed of the vehicle. This has the defect that it only holds good for top gear.

Other types of equipment detect the position of the speedometer needle. The accuracy of such systems is entirely relative and they are awkward to adjust quickly when changing from one governing speed to another.

There are also certain methods which employ direct action on the engine independent of the driver, such as cutting out the ignition or completely closing the butterfly valve controlling the fuel mixture being admitted.

The invention has as an object to enable the speed of a vehicle to be limited in a manner which is independent on, or independent of, the driver, so as to make traffic safer the to meet the requirements of various regulations.

SUMMARY OF THE INVENTION

In a system of the type mentioned above, this object is achieved, in accordance with the invention, by associating said return means with control means which include at least one comparator which receives an actual-speed signal emitted by a sensor which senses the actual speed of the vehicle, and a limit speed signal which is established by a speed limit presetting member, this comparator being capable of supplying to said return means a signal to shift the speed-controlling member such as a gas pedal to a reduced speed position as soon as the actual speed of the vehicle exceeds the limit speed, by associating the speed limit presetting member with an internal control for controlling the limit speed which control is fitted to the vehicle and is capable of supplying to the speed limit presetting member information termed the internal established limit speed, and if desired by making the speed limit presetting member also capable of receiving at least one externally supplied limit speed signal, which is received from, for example, a radio receiver, which latter is fitted to the vehicle and is capable of picking up signals transmitted by at least one signal beacon set up along the route.

The invention described herein thus differs from prior art systems in that it is possible to set the limit speed from outside by means which are not subject to the will of the driver and which have priority over the limit speed which the driver has previously selected; as an example this allows the speed of a stream of vehicles approaching the site of an accident to be slowed progressively. In this way it is possible for example to prevent multiple pile-pus on toll-road, trunk routes and other motorways, using means which are inexpensive and highly mobile. The means in question may be combined with a visual signal. Furthermore, in the system according to the invention, the gas or accelerator pedal is returned as soon as the imposed limiting speed is exceeded but it is always open to the driver to override the restriction, in which case the resistance offered by such pedal is greatly increased above that which is normal.

The new system thus comprises an assembly which measures the actual speed of the vehicle, compares it to a desired value after storing it, and then acts on the means for returning the gas or accelerator pedal; it may also act on sound and/or illuminated alarms inside and/or outside the vehicle.

BRIEF DESCRIPTION OF THE DRAWINGS

Other features and advantages of the invention will be better understood from reading the following description of one embodiment thereof with reference to the accompanying drawings, in which.

SPECIFIC DESCRIPTION OF PREFERRED EMBODIMENTS

Figure 1:
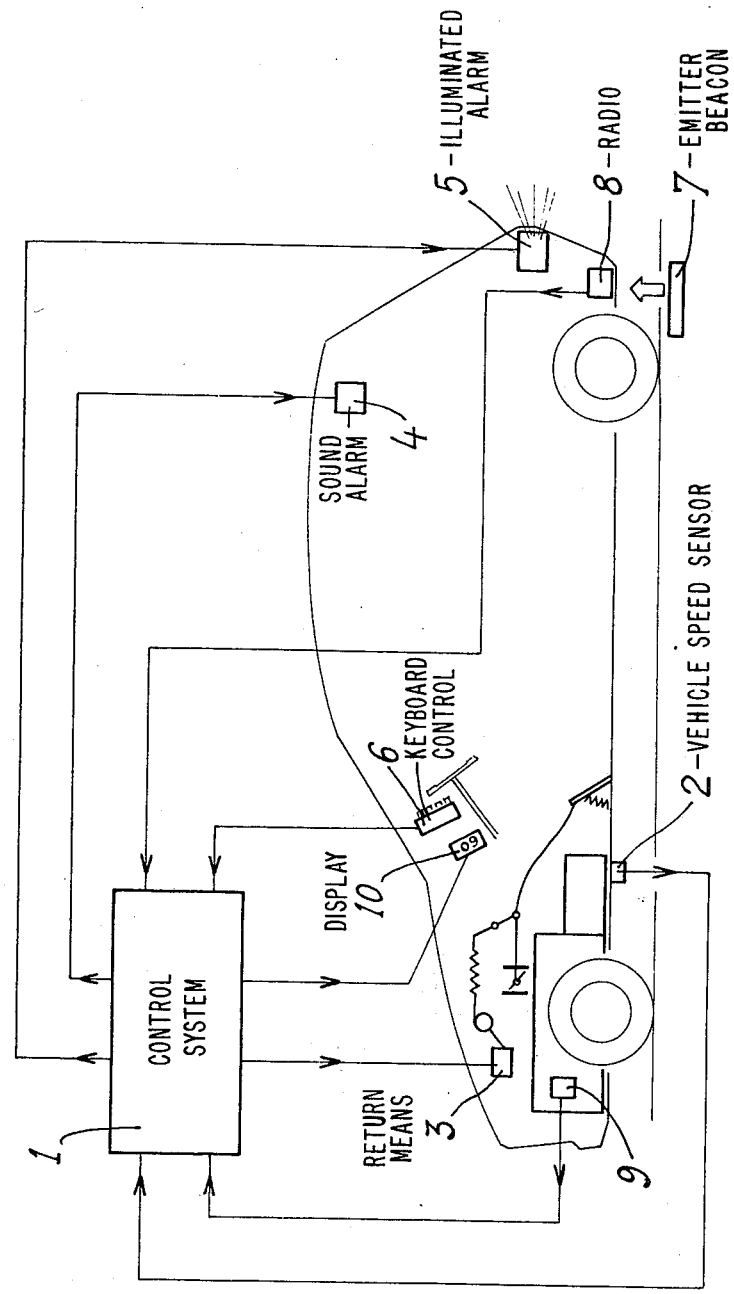
FIG. 1 is a schematic view of an automobile and of the various devices which go to make up one embodiment of the speed limiting system.
Figure 2:
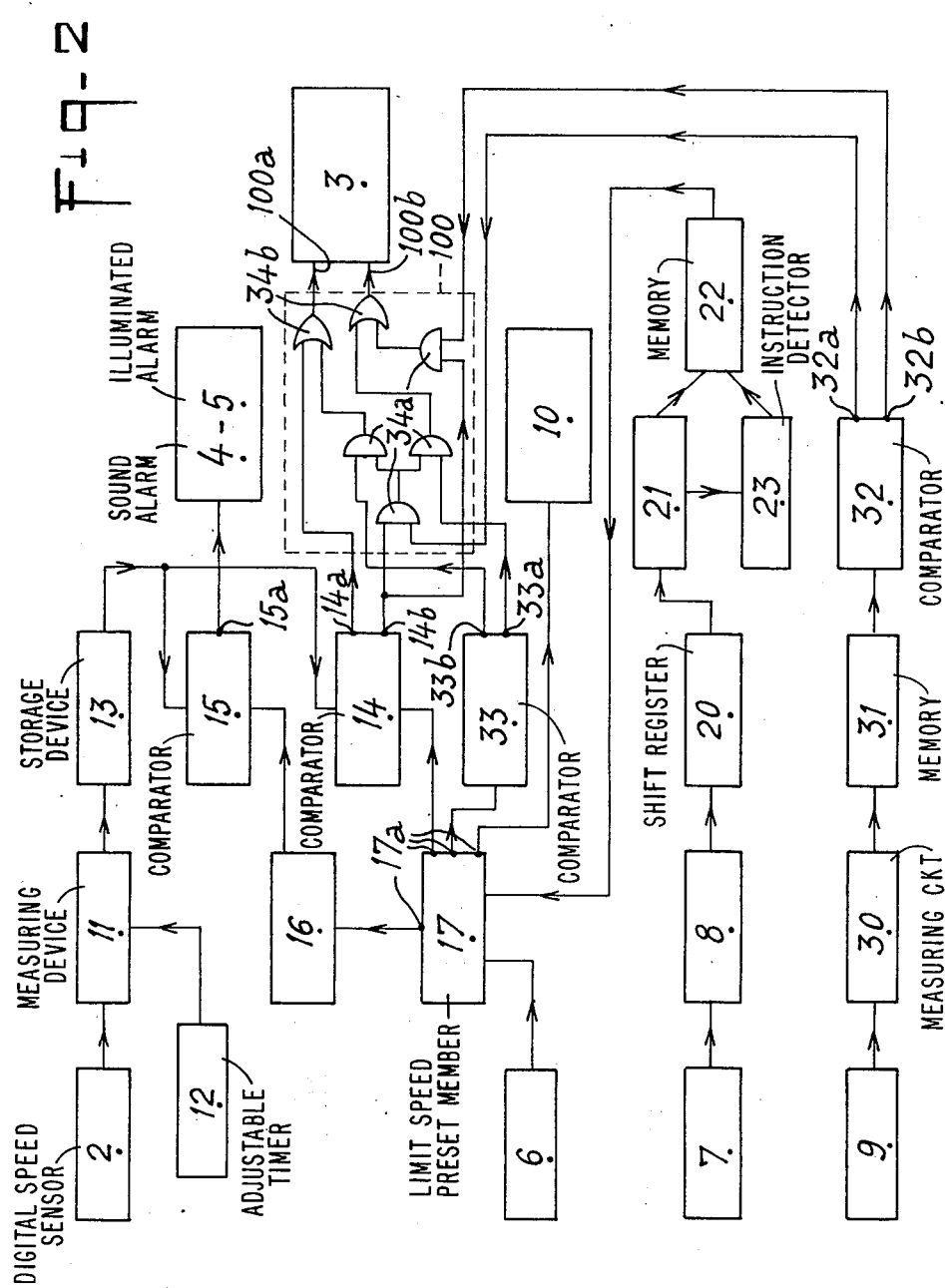
FIG. 2 shows an embodiment of the electronic calculating circuit associated with the limiting system shown in FIG. 1.

One embodiment of the system according to the invention is described below with reference to FIGS. 1 and 2.

This system includes an entirely numerical electronic measuring circuit or device 11 which measures information coming from a known type of digital speed sensor 2. Device 11 is formed by a known frequency meter.

An adjustable timer 12 of any known kind allows the measuring circuit to be adjusted to the characteristics of the vehicle and the tyres used.

The speed of the vehicle which has been calculated in this way is stored in a conventional storage circuit device 13 before being compared to the required speed in the first and second comparators 14 and 15.

In the embodiment shown, the comparison uses two thresholds: a first threshold equivalent to a calling back to order which takes the form of the gas or accelerator pedal being raised by return means 3, and a second threshold which sets off an internal sound alarm 4 or an illuminated alarm 5 outside the vehicle.

Thus, in the first case the signal $v$ for the actual speed of the vehicle, which is obtained from device 11 and stored in device 13, is compared with the threshold or set speed signal $V_1$ by the first comparator 14. In the second case the actual speed (signal $v$) of the vehicle is compared in the second comparator 15 with a second threshold or set speed signal $V_2 = V_1 + \Delta V$. Signal $V_2$ (alarm speed) is obtained from an adder circuit 16 and $\Delta V$ may correspond to a preset increase in speed of 10 km/h for example. $\Delta V$ may also be a function of the set speed $V_1$ and is not necessarily a constant.

Within the vehicle, the set limiting speed is selected by means of a key-board or internal control 6, which has the advantage of being simple and quick to handle. When the keys are pressed simultaneously, suitable wiring makes it possible for only the lower speed to be taken as a reference for the set speed.

Information termed external set-speed information, originating from emitter beacons 7 positioned along (or on) the highway, is equivalent to instructions for a restriction to begin, repetitions, and for the restriction to end. Repeaters may exist every kilometer and after every intersection.

The means 3 for returning the accelerator pedal are of the depressable i.e. the over-ridable type, that is to say that they are capable of returning the said pedal with a limited force of at least a predetermined amount.

Thus, the return means 3 in question are so controlled that they are able to raise the accelerator pedal as soon as the actual speed $v$ of the vehicle exceeds a predetermined speed or first set speed $V_1$. The means of controlling the return means 3 comprise a first comparator 14 which receives on the one hand an actual speed signal $v$ which is emitted by a sensor 2 which senses the actual speed of the vehicle, and on the other hand a signal for the required speed $V_1$ which is emitted by a limit speed presetting member 17. Output 14a of comparator 14 is capable of supplying, via an instruction processing circuit 100, a signal to the return means 3 to raise the gas or accelerator pedal as soon as the actual speed $v$ of the vehicle exceeds the set speed $V_1$. The speed presetting member 17 is associated with internal control (key-board) 6 for controlling the set speed, this control being provided on the dashboard of the vehicle and being capable of supplying to the said member 17 information termed internal set-speed information $V_1 i$. The member 17 is also capable of receiving signals termed external speed limit setting signals $V_1 e$ which are received by means of a radio receiver 8 which is fitted to the vehicle and is able to pick up signals transmitted by a beacon 7.

The system also includes a second comparator 15 which receives on the one hand the actual speed signal $v$ and on the other hand a second, set speed signal $V_2$ the value of which is equivalent to the first set speed $V_1$ from the member 17, plus a constant value $\Delta V$. The second comparator 15 is capable of supplying, from its output 15a, an alarm signal to internal and/or external visual and/or audio alarm-devices 4, 5 as soon as the actual speed $v$ of the vehicle exceeds the said second set speed $V_2$.

The member 17 is so formed as to supply, at its output terminals 17a, a set speed signal $V_1$ equivalent to the lower one of the internal ($V_1 i$) and external ($V_1 e$) set limit speeds, which latter are set by the internal control 6 and the signal beacon 7 respectively.

When the external signal $V_1 e$ has been received by means of sensors 8 of a known type, the information is stored in digital form in a shift register 20 and then decoded and checked in a circuit 21, to prevent any mistakes, before it is memorised in a circuit 22 and is used to preset the set speed in the member 17. The member 17 for presetting the first set speed $V_1$ incorporates a system for giving priority to limit set speeds coming from the emitter beacons 7 over speeds preset from inside the vehicle at 6. This priority only applies if the external limit speed is lower than the limit speed selected internally.

A circuit 23 allows the instruction for a restriction to end to be detected prior to the memory circuit 22 being acted on.

A parallel comparison chain detects the speed $r$ of the engine of the vehicle by taking from the ignition 9 information which is measured in a measuring circuit 30 and then memorised in a memory circuit 31. After an engine-speed threshold R is reached this comparison chain acts by means of a comparator 32 on the return means 3 for the gas or accelerator pedal, but only when the speed set by the member 17 is equal to or less than a given speed $V_3$ termed on the third set speed (which may be equal to 60 km/h for example), which state is shown by comparator 33. This may therefore be of assistance in reducing both noise and atmospheric pollution in built-up areas. AND gates 34a and OR gates 34b are used to select the instruction which is given, as will be explained below.

Thus, the control means associated with the return means 3 include a third comparator 32 which compares an actual engine-speed signal $r$ with a set engine-speed signal R and which is capable of supplying to the said return means 3, via its output 32a and the instruction processing circuit 100, a signal for the pedal to be raised as soon as the actual speed $r$ of the engine becomes greater than speed R.

The system shown includes means which, when the actual speed $v$ of the vehicle is higher than the third speed $V_3$ which is independant of the first speed $V_1$ (and therefore of the second speed $V_2$), cancels out the signal for the pedal to the raised which is emitted by the third comparator 32. In the example shown, these cancelling means comprise: (a) the instruction processing circuit 100 which is formed from AND gates 34a and OR gates 34b, (b) a fourth comparator 33 which compares the first speed signal $V_1$ with the third speed signal $V_3$ and which is capable of supplying at its output terminal 33a a first cancelling signal as soon as $V_1 > V_3$, and (c) the first comparator 14, which is capable of supplying a second cancelling signal from its output 14b as soon as $v < V1$. The first and second cancelling signals produced in this way are suitably processed in circuit 100 in conjunction with the pedalraising signals from comparators 14 and 32 and with additional signals which are emitted in the one case by comparator 32 (terminal 32b) as soon as $r < R$, and in the other case by comparator 33 (terminal 33b) as soon as $V_1 \leq V_3$. Thus, the processing circuit is capable of feeding to the return means 3, on the one hand, via conductor 100a, a signal for the pedal to be raised as soon as the actual speed $v$ of the vehicle exceeds the speed $V_1$, and on the other hand, via conductor 100b, a signal which allows the return means to withdraw as soon as the said speed $v$ drops below the said speed $V_1$.

An electronic display 10 showing the required limiting speed is added to the dashboard and may wink when this speed is exceeded.

Figure 3:
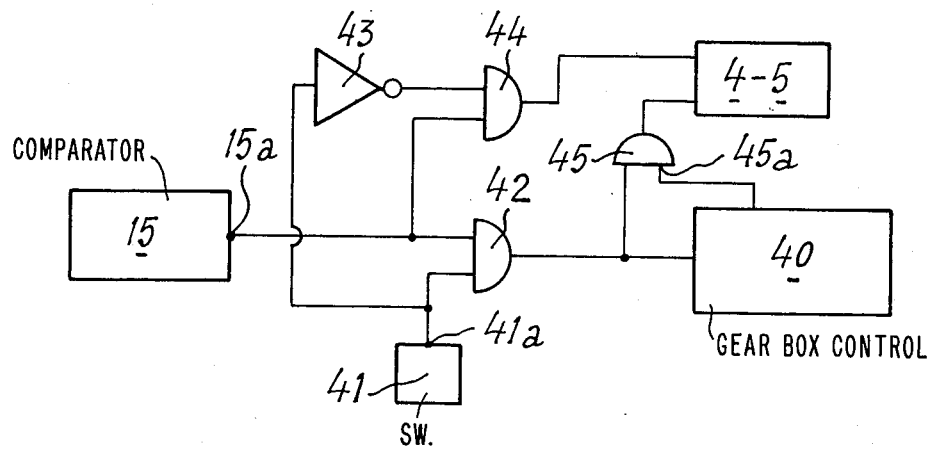
FIG. 3 shows a modification of the circuit of FIG. 2.
Figure 4:
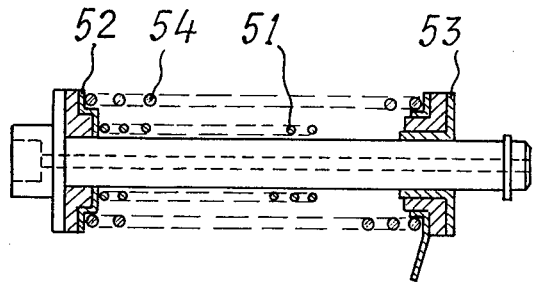
FIG. 4 shows an embodiment of the contact switch of FIG. 3.

The embodiment shown in FIGS. 3 and 4 relates more particularly to an arrangement the purpose of which is to brake vehicles fitted with an electrically controlled gearbox automatically under certain conditions, which it does by causing the gear-box to change to a lower gear-ratio, thus giving rise to an engine-breading effect, as soon as the actual speed of the vehicle exceeds the set speed $V_2$.

At speeds where it could be dangerous to the engine and vehicle, any such change-down is prevented by the gear-box's own internal control device.

Furthermore, any such change-down is also prevented when the driver consciously presses down on the return means with a limited force of more than the predetermined size. This also ensures that it is always open to the driver to override the means which return the accelerator pedal.

In the embodiment shown in FIGS. 3 and 4, the signal from output 15a of the second comparator 15 is also capable of causing the electrical control means 40 for the gear-box of the vehicle to change to a lower gear-ratio.

An electrical contact switch 43, such as that shown in FIG. 4, prevents the arrangement from operating as soon as the return means 3 are pressed down with a force which is of more than a predetermined amount.

Thus, referring to FIG. 4, electrical contact by means of which output 41a of contact switch 41 is earthed is established between spring 51 and parts 52 and 53 when compression spring 54, which may be calibrated at 4kg for example, is subjected to a force of more than 5kg for example.

When this happens, the closure of contact switch 41 prevents the signal from output 15a, which is received at AND gate 42, from acting on the electrical control means 40 for the gear-box. Also, the closure of switch 41 allows the aforementioned internal and/or external alarms to be actuated via IN (sign-changing) gate 43 and AND gate 44.

These latter alarms, 4, 5, may likewise be actuated when a change-down order appears at the output of AND gate 42 and when there is at the other input 45a of AND gate 45 a signal that engine speed is too high, this latter signal being produced in the internal control means and indicating that a change to a lower gear-ratio, which might be dangerous to the engine and the vehicle, is not allowed to take place.

In practice the system operates as follows:

If a given limiting speed $V_1i$ of 100 km/h for example has been selected by the driver by means of his keyboard 6 and if the vehicle is moving at well below this speed, nothing happens.

If the vehicle should exceed the desired speed $V_1i$, the driver feels the accelerator pedal rise beneath his foot under the prompting of the return means 3, unless the force which he is exerting on the pedal is greater than a given value such as 5kg, in which case the return means will be incapable of raising the pedal.

Generally, however, the driver will allow the pedal to lift and the vehicle slows down. As long as the speed of the vehicle is between 100 km/h and a slightly slower speed such as 98 km/h, because of the hysteresis built into the calculating system the return means remain in place and the pedal is only able to move past the position it is occupying if a force greater than 5 kg is exerted.

If the vehicle goes on to exceed the limiting speed and does not by more than a predetermined amount $\Delta V$ (10 km/h for example), thus reaching a speed of more than 110 km/h, it is braked as a result of the electrically controlled gear-box changing to a lower gear-ratio and giving rise to an engine-braking effect.

On the other hand, if, while the vehicle is still exceeding a speed of, in the example, 110 km/h, the driver exerts a force of more than 5kg for example on the pedal, in which event the means for returning the pedal is overriden (which it is from 4kg for example), there will be no automatic change-down in the gear-box because the governing speed is being exceeded deliberately.

It should also be mentioned that at speeds which might be dangerous to the engine and vehicle any change-down is prevented by the internal electrical device for controlling the gear-box.

If speed drops below 98 km/h the return means withdraw and, if he desires, the driver can increase the speed $v$ of the vehicle without effort, which results in a further cycle of restraint.

In actual fact it is easy, if desired, to hold the vehicle between 98 and 100 km/h on the open road without causing the pedal to be raised a large number of times.

Various modifications may, of course, be made by the man skilled in the art to the apparatus or methods which have just been described merely as non-limiting examples, without departing from the scope of the invention as defined by the appended claims.

Thus, it is possible for example to use a bi-directional counter into which the desired limit speed is set and which counts down from the set value for a given period of time. If during this period the counter passes the value zero the speed of the vehicle is more than the required speed.

It is also possible to establish the absolute difference between the actual speed of the vehicle and the desired limit speed and to exert a control function on the return means which is proportional to this absolute difference.

It should be pointed out that all the devices and means schematically illustrated by numbered rectangles are in themselves well-known and may take any of the well-known and defined forms. It is for this reason and also because they do not per se constitute the invention, that it is considered unnecessary fully to illustrate them.

I claim:

1. In a vehicle speed-limiting system, of the type which includes over-ridable return means to raise a main speed-controlling member with a limited force of at least a predetermined amount as soon as the vehicle exceeds a predetermined speed, the improvement comprising return means associated with control means which include at least one comparator arranged to receive an actual-speed established by a sensor operable to sense the actual speed of the vehicle, and also a preset speed limit signal established by a speed limit presetting member, said comparator being arranged to supply to said return means a signal to shift said main speed-controlling member to a reduced speed position as soon as the actual speed of the vehicle exceeds a limit speed corresponding to said preset speed limit signal, and then, when the vehicle is moving at a speed between said limit and a given slower speed, said comparator preventing said main speed-controlling member from moving past the position it is occupying at the time toward a higher speed position, while below this given slower speed the comparator supplies a signal which allows said return means to be withdrawn and thus to no longer act on said main speed-controlling member, said presetting member being adjustable from within the vehicle to selectively vary said limit speed, said system including a second comparator which is arranged to receive said actual speed signal, and also to receive a second preset speed limit signal which corresponds to said speed limit set by said presetting member plus a predetermined speed increment; including control means associated with said return means and having a third comparator which compares a signal for the actual speed of the engine of the vehicle, transmitted by sensor means to sense the speed, with a required engine-speed signal and which is capable of supplying to said return means a signal for said return means to be raised as soon as the actual speed of the engine rises above to said required engine-speed; and means which operate to cancel out the signal for said return means to be raised emitted by said third comparator, when the actual speed of the vehicle is higher than a third limit speed.

2. In a vehicle speed-limiting system, of the type which includes over-ridable return means to raise a main speed-controlling member with a limited force of at least a predetermined amount as soon as the vehicle exceeds a predetermined speed, the improvement comprising return means associated with control means which include at least one comparator arranged to receive an actual-speed signal established by a sensor operable to sense the actual speed of the vehicle, and also a preset speed limit signal established by a speed limit presetting member, said comparator being arranged to supply to said return means a signal to shift said main speed-controlling member to a reduced speed position as soon as the actual speed of the vehicle exceeds a limit speed corresponding to said preset speed limit signal, and then, when the vehicle is moving at a speed between said limit speed and a given slower speed, said comparator preventing said main speed-controlling member from moving past the position it is occupying at the time toward a higher speed position, while below this given slower speed the comparator supplies a signal which allows said return means to be withdrawn and thus to no longer act on said main speed-controlling member said presetting member being adjustable from within the vehicle to selectively vary said limit speed; and including a second comparator which is arranged to receive said actual speed signal, and also to receive a second preset speed limit signal which corresponds to said speed limit set by said presetting member plus a predetermined speed increment; said second comparator being arranged to supply an alarm signal to an alarm device means as soon as said actual speed of the vehicle exceeds the said second preset speed limit; said second comparator being arranged to supply to a control member a change-down signal which allows a gear-box means of the vehicle to change a lower gear-ratio, said control member incorporating safety means which are arranged to prevent the said change under predetermined conditions; and means for cancelling said change-down signal when the driver presses on the means for returning an accelerator pedal of the vehicle.

* * * * *